May 24, 1966 TAKUYA KAWAMOTO ETAL 3,253,154

ELECTRIC DEVICE USING BISTABLE TUNNEL DIODE CIRCUIT TRIGGERING MONOSTABLE TUNNEL DIODE CIRCUIT

Filed Feb. 28, 1962

Inventors.
Takuya Kawamoto
Sawako Kawamoto

Hill, Sherman, Meroni, Gross + Simpson by Attorneys 3,253,154

ELECTRIC DEVICE USING BISTABLE TUNNEL DIODE CIRCUIT TRIGGERING MONOSTABLE TUNNEL DIODE CIRCUIT

Takuya Kawamoto and Sawako Kawamoto, both of Setagaya-ku, Tokyo Japan, assignors to Sony Corporation, Tokyo, Japan, a corporation of Japan Filed Feb. 28, 1962, Ser. No. 176,197
Claims priority, application Japan, Mar. 2, 1961, 36/7,374
4 Claims. (Cl. 307—88.5)

This invention relates to an electronic circuit using tunnel diodes and more particularly to a circuit for responding to input pulses to develop output pulses of a certain amplitude and duration, suitable for use in an electronic computer or the like.

Various electronic circuits using tunnel diodes have been proposed for use in electronic computers and the like, but such circuits have not been satisfactory due to the fact that wide variations occur in the characteristics of tunnel diodes. The degree of variation can be reduced by careful manufacture but even then there are practical limits. As to germanium tunnel diodes, for instance, an error of 5 to 10% in maximum current and voltage ratings occur even with careful manufacture. In addition, consideration must be given to the fact that the characteristic of a tunnel diode, i.e. the energy level in the p-n junction can change gradually or abruptly. Furthermore, many of the circuits heretofore proposed have been comparatively sensitive to noise and have been unreliable. For these reasons, the circuits heretobefore proposed have not been attractive, particularly for computer circuits and the like where the avoidance of error is extremely important.

This invention was evolved with the general object of providing tunnel diode circuitry which is not affected substantially by non-uniformities and changes in tunnel diode characteristics.

Another object of the invention is to provide a tunnel diode circuit having a reliability sufficient for use in an electronic computer.

A further object of the invention is to provide a tunnel diode circuit operative as a logic circuit.

A still further object of the invention is to provide an electronic pulse circuit of small size and small power consumption.

In general, the invention involves the use of a bistable tunnel diode circuit and monostable tunnel diode circuit, so combined as to achieve reliable error-free operation regardless of variations and changes in tunnel diode characteristics, and insensitive to noise and variations in operating conditions. The circuitry is comparatively simple, occupies very little space and has very low power consumption.

These and other objects, features and advantages will become more fully apparent from the following detailed discussion taken in conjunction with the accompanying drawing which illustrates a preferred embodiment and in which.

Figure 1:
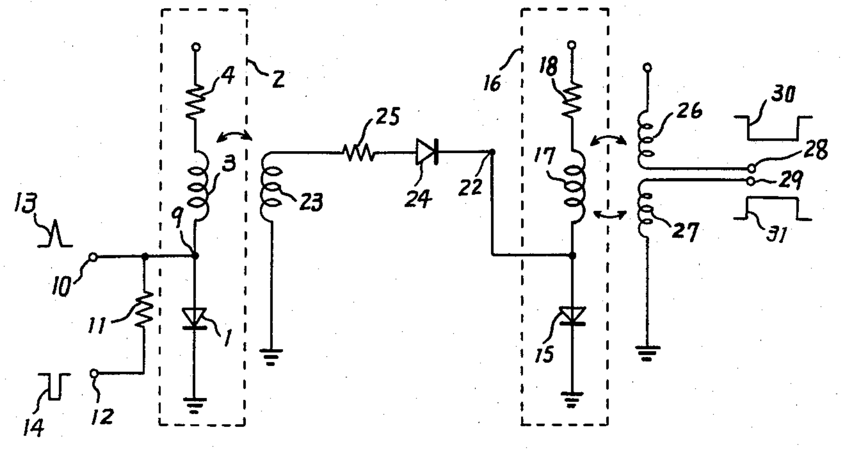
FIGURE 1 is a circuit diagram illustrating one preferred embodiment of a tunnel diode circuit according to this invention.

Referring to FIGURE 1, a tunnel diode 1 is used in a bistable circuit generally designated by reference numeral 2, the diode 1 being connected to a suitable D.C. source (not shown) through an inductance or coil 3 and a load resistor 4 in series therewith.

The circuit 2 is well known, by itself, and many modifications and variations may be made therein without departing from the invention. In brief, however, the circuit constants are so chosen that the characteristic curve 5 (FIGURE 2) of the tunnel diode 1 is intersected by a load line 6 at two points 7 and 8 of stable operation, the negative resistance region being between the points 7 and 8.

To trigger the bistable tunnel diode circuit 2 from one condition of stability to the other, a connection point 9 at the junction between diode 1 and coil 3 is connected to an input terminal 10 and also through a damping resistor 11 to a second input terminal 12. The signal containing positive pulses 13, as diagrammatically illustrated, may be applied to input terminal 10 to trigger the circuit 2 from a high current stable condition such as represented by point 7 in FIGURE 2, to a low current stable condition such as represented by point 8 in FIGURE 2. A signal containing negative pulses 14, as diagrammatically illustrated, may be applied to input terminal 12 to trigger the tunnel diode circuit 2 from a low current stable condition such as represented by point 8 in FIGURE 2, back to a high current stable condition such as represented by point 7. The pulses 14 are preferably in the form of regularly recurring clock pulses, while pulses 13 are preferably in the form of signal pulses which may or may not occur during the time intervals between clock pulses 14. As will be described, output signals are generated in a coil inductively coupled to the coil 3, when the circuit shifts from one condition of stability to the other.

Figure 3:
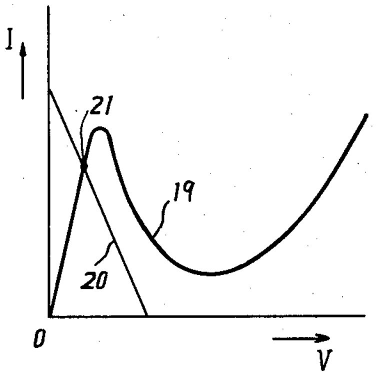
FIGURE 3 is a characteristic curve for explaining operation of a monostable tunnel diode circuit portion of the circuit of FIGURE 1.

Output signals from the bistable circuit 2 are applied to a tunnel diode 15 and a monostable circuit 16, tunnel diode 15 being connected to a suitable D.C. source (not shown) through an inductance or coil 17 and a load resistor 18 in series therewith. This circuit is also well known, by itself, and modifications and variations may be made therein without departing from the invention. In brief, the circuit constants are so chosen that the characteristic curve 19 (FIGURE 3) of the tunnel diode 15 is intersected by a load line 20 only at a point 21 of stable operation, in a positive resistance region where the current and voltage values are slightly less than those at the maximum current point.

An input terminal 22 is connected to a connection point of circuit 16, at the junction between diode 15 and coil 17. Pulse signals are applied to input terminal 22 by means of an inductance or coil 23 inductively coupled to the coil 3 of the bistable circuit 2, one end of the coil 23 being grounded and the other end thereof being connected to circuit point 22 through a diode 24 and a resistor 25. With this arrangement, the monostable circuit 16 is triggered only by positive pulse signals from the bistable circuit 2. When triggered, the tunnel diode 15 conducts for a certain time interval as determined by circuit constants, and by means of inductances or coils 26 and 27 inductively coupled to the coil 17 there are developed at output terminals 28 and 29 negative and positive output pulses 30 and 31 as diagrammatically illustrated.

Figure 2:
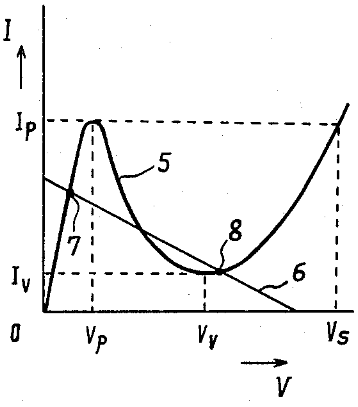
FIGURE 2 is a characteristic curve for explaining operation of a bistable tunnel diode circuit portion of the circuit of FIGURE 1.

In the operation of the complete circuit, the bistable circuit 2 may initially be at a high current stable condition such as represented by point 7 in FIGURE 2. When the positive signal pulses 13 are applied to the input terminal 10, the bistable circuit 2 is triggered to a low current stable condition such as represented by point 8 in FIGURE 2. At that time, a negative pulse is developed in the coil 23 and no pulse is applied to the monostable circuit 16. Then when a negative pulse 14 is applied to the input terminal 12, the bistable circuit 2 is triggered back to the high current stable condition, represented by point 7, and a positive triggering pulse is applied to the monostable circuit 16 to develop the output pulses 30 and 31 for the first time.

It is noted that even if one or more additional positive pulses are applied to the bistable circuit 2 after it is triggered to the low current stable condition, represented by point 8, there is no effect on the circuit. Accordingly, the circuit operates to detect whether there is any signal pulse between the clock pulses 14 having a predetermined period and output pulses are obtained only when signal pulses exist.

Since the tunnel diode 1 performs only the bistable operation and the tunnel diode 15 performs only the monostable operation and the pulse amplification and shaping alone, nonuniformities or changes in the characteristics of the tunnel diode exert scarcely any influence on the operation of the circuit. The monostable operation is generally unstable and apt to be affected by noise but with the circuit of this invention, the monostable circuit 16 responds only to the output of the bistable circuit 2 and there is no appreciable noise or possibility of error.

It will be apparent to those skilled in the art that an electronic computer with reliable operation can readily be formed by combining the circuit of this invention with a logic circuit such as an "AND" circuit, an "OR" circuit, a "NOT" circuit or the like.

Preferably the tunnel diode 1 of the bistable circuit 2 has a relatively low peak current value $I_p$ (for example, 2 milliamperes) so as to improve the sensitivity to input pulses and the tunnel diode 15 of the monostable circuit 16 has a substantially larger peak current value $I_p$ (for example, 5 to 10 milliamperes) so as to obtain a large output pulse.

In the illustrated circuit, the positive and negative pulses are applied to separate input terminals 10 and 12, but it will be apparent that positive and negative pulses can be applied to one input terminal and when, for example, the negative pulse signals arrive immediately after positive pulse signals, output pulse signals can be obtained from the monostable circuit.

It will be apparent that modifications and variations may be effected without departing from the spirit and scope of the novel concepts of the present invention.

We claim as our invention:

1. In a pulse-responsive circuit including a bistable tunnel diode circuit having an input and an output and having a first tunnel diode with first and second stable operating conditions, a monostable tunnel diode circuit having an input and an output and having a second tunnel diode, means connected with said second tunnel diode for operating said second tunnel diode with only one stable operating condition and with said monostable tunnel diode circuit being responsive to an input pulse at the input thereof exceeding a predetermined amplitude to switch said second tunnel diode to a nonstable operating condition and to provide at the output thereof a substantial output signal of a predetermined amplitude and duration and synchronized with said input pulse, and a coupling circuit connected between the output of said bistable circuit and the input of said monostable circuit, said bistable circuit being responsive to a signal pulse at its input to switch said first tunnel diode from said first stable operating condition to said second stable operating condition, said pulse-responsive circuit being characterized by means connected with said bistable circuit for supplying clock pulses periodically at regular intervals to said bistable circuit for switching said first tunnel diode from said second stable operating condition to said first stable operating condition, and means connected with said first tunnel diode for operating said first tunnel diode to supply a triggering pulse via said coupling circuit to the input of said monostable circuit each time said first tunnel diode is switched from said second stable operating condition to said first stable operating condition, with the amplitude of said triggering pulse exceeding said predetermined amplitude to produce said substantial output signal of said predetermined amplitude and duration from the output of said monostable circuit, with said monostable circuit providing said substantial output signal only when said first tunnel diode is switched from said second stable operating condition to said first stable operating condition by one of said clock pulses, and with each substantial output signal from the output of said monostable circuit being synchronized with one of said clock pulses.

2. The pulse-responsive circuit of claim 1 further characterized by said coupling circuit comprising a coil inductively coupled to said bistable tunnel diode circuit to generate a pulse of a first polarity each time said first tunnel diode is switched from said first stable operating condition to said second stable operating condition in response to a signal pulse at the input of said bistable circuit and to generate a pulse of a second opposite polarity each time said first tunnel diode is switched from said second stable operating condition to said first stable operating condition in response to one of said clock pulses, and means for suppressing the pulses of said first polarity while tranmitting said pulses of said second opposite polarity to the input of said monostable circuit to provide said triggering pulses therefor.

3. The pulse-responsive circuit of claim 1 further characterized by said first stable operating condition corresponding to a relatively high current flow through said first tunnel diode and a relatively low voltage thereacross, and said second stable operating condition corresponding to a relatively low current flow through said first tunnel diode and a relatively high voltage thereacross, said monostable tunnel diode circuit having a peak current rating value substantially higher than that of said bistable tunnel diode circuit, said bistable circuit having a series inductance in series with said first tunnel diode, said coupling circuit comprising a coil inductively coupled to said series inductance of said bistable circuit to generate a pulse of a first polarity each time said first tunnel diode is switched from said first stable operating condition to said second stable operating condition in response to a signal pulse at the input of said bistable circuit and to generate a pulse of a second opposite polarity each time said first tunnel diode is switched from said second stable operating condition to said first stable operating condition in response to a clock pulse, and said coupling circuit further comprising a diode for transmitting pulses of said second opposite polarity only to the input of said monostable circuit to provide said triggering pulses therefor.

4. The pulse-responsive circuit of claim 1 further characterized by said first tunnel diode of said bistable circuit having a relatively low peak current value of the order of two milliamperes and said second tunnel diode of said monostable circuit having a substantially larger peak current value of the order of from 5 to 10 milliamperes, said first bistable circuit having a series inductance in series with said first tunnel diode, said coupling circuit comprising a coil inductively coupled to said series inductance of said bistable circuit to generate a pulse of a first polarity each time said first tunnel diode is switched from said first stable operating condition to said second stable operating condition in response to a signal pulse at the input of said bistable circuit and to generate a pulse of a second opposite polarity each time said first tunnel diode circuit is switched from said second stable operating condition to said first stable operating condition in response to a clock pulse, and means for suppressing the pulses of said first polarity while transmitting said pulses of said second opposite polarity to the input of said monostable circuit to provide said triggering pulses therefor.

References Cited by the Examiner

UNITED STATES PATENTS

| | | | |
|---|---|---|---|
| 3,097,312 | 7/1963 | Miller | 307—88.5 |
| 3,133,206 | 5/1964 | Bergman et al. | 307—88.5 |

OTHER REFERENCES

IBM Technical Disclosure Bulletin, vol. 4, No. 7, December 1961, "Gate," M. Hilsenrath.

Electronics, June 24, 1960, "Tunnel Diode Logic Circuits," by W. F. Chow.

ARTHUR GAUSS, *Primary Examiner.*

J. ZAZWORSKY, *Assistant Examiner.*